(12) United States Patent
Cathey

(10) Patent No.: US 6,864,927 B1
(45) Date of Patent: Mar. 8, 2005

(54) HEAD UP DISPLAY WITH ADJUSTABLE TRANSPARENCY SCREEN

(75) Inventor: David A. Cathey, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 08/775,430

(22) Filed: Dec. 31, 1996

(51) Int. Cl.⁷ ..................... G02F 1/1335; G02F 1/1333
(52) U.S. Cl. ......................................... 349/11; 349/86
(58) Field of Search ............................... 349/11, 16, 1, 349/86

(56) References Cited

U.S. PATENT DOCUMENTS

| | | | | |
|---|---|---|---|---|
| 4,447,128 A | * | 5/1984 | Ferrer | 349/11 |
| 4,997,263 A | * | 3/1991 | Cohen et al. | 349/11 |
| 4,998,784 A | | 3/1991 | Freeman | 350/3.7 |
| 5,013,135 A | | 5/1991 | Yamamura | 350/174 |
| 5,015,086 A | | 5/1991 | Okaue et al. | 351/44 |
| 5,034,732 A | | 7/1991 | Ilino | 340/705 |
| 5,061,996 A | | 10/1991 | Schiffman | 358/103 |
| 5,081,542 A | * | 1/1992 | Efron et al. | 349/11 |
| 5,208,688 A | * | 5/1993 | Fergason et al. | 359/53 |
| 5,231,379 A | | 7/1993 | Wood et al. | 340/705 |
| 5,278,696 A | | 1/1994 | Suvada | 359/629 |
| 5,291,184 A | | 3/1994 | Ilino | 345/7 |
| 5,343,313 A | * | 8/1994 | Fergason | 349/11 |
| 5,381,309 A | | 1/1995 | Borchardt | 362/31 |
| 5,410,424 A | * | 4/1995 | Konuma et al. | 349/86 |
| 5,414,461 A | * | 5/1995 | Kishi et al. | 348/115 |
| 5,416,617 A | * | 5/1995 | Loiseaux et al. | 349/1 |
| 5,459,645 A | | 10/1995 | Sattler et al. | 362/30 |
| 5,479,275 A | | 12/1995 | Abileah | 359/48 |
| 5,486,840 A | | 1/1996 | Borrego et al. | 345/7 |
| 5,497,271 A | * | 3/1996 | Mulvanny et al. | 359/631 |
| 5,502,456 A | | 3/1996 | Kovenaga et al. | 345/359 |
| 5,532,852 A | | 7/1996 | Kalmanash | 359/73 |
| 5,537,233 A | | 7/1996 | Miura et al. | 359/48 |
| 5,537,234 A | | 7/1996 | Williams et al. | 359/59 |
| 5,543,967 A | | 8/1996 | Robson | 359/614 |
| 5,572,342 A | | 11/1996 | Higuchi | 359/49 |
| 5,576,724 A | | 11/1996 | Fukatsu | 345/7 |
| 5,589,960 A | * | 12/1996 | Chiba et al. | 349/76 |
| 5,638,202 A | * | 6/1997 | Rofe | 349/11 |
| 5,708,410 A | * | 1/1998 | Blank et al. | 359/630 |
| 6,424,321 B1 | * | 7/2002 | Ronzani et al. | 345/8 |

FOREIGN PATENT DOCUMENTS

JP 58-80616 * 5/1983 ............... 349/11

OTHER PUBLICATIONS

Bean, Gary, "A Heads–up Display Could Handle Complex Screen Info.," Open Systems Today, Sep. 15, 1994, Issue 157, Section: Ost Labs.
Hecht–Zajac, Optics, pp. 222–226.
Norman, Diane, "Alpine on New FPD Path," Nov. 21, 1994, Issue 931, Section: News.
Standish LCD, Div. of Standish Industries, Inc., "Liquid Crystal Display Products", p. 5.
Teresko, John et al., "Flash–blindness protection", Industry Week, Jul. 17, 1989, Section: Emerging Technologies, p. 39.

* cited by examiner

Primary Examiner—Dung T. Nguyen
(74) Attorney, Agent, or Firm—TraskBritt

(57) ABSTRACT

This invention is directed to an improved head up display system where the image of the display is projected onto a transparent or semitransparent screen having a high-speed, adjustable transparency to compensate for changing ambient light conditions.

6 Claims, 2 Drawing Sheets

HEAD UP DISPLAY WITH ADJUSTABLE TRANSPARENCY SCREEN

BACKGROUND OF THE INVENTION

1. Field of the Invention

The present invention relates generally to an improvement in head up display systems and, more particularly, to controlling the transparency of the panel upon which the display is projected so as to compensate for changing ambient light conditions.

2. State of the Art

Head up displays were first created about thirty years ago when the performance of military jet aircraft progressed such that a pilot did not have time to make the required scans of instruments while concentrating on flying during tactical situations. A head up display provides a transparent panel in the pilot's line of sight. The panel is usually set at an angle so that information can be displayed on the screen and read by the pilot. Similar systems are now increasingly available in automobile, van, and truck vehicles. Vehicle information such as speed, operating gauges, and the like, are projected by an image light typically from a liquid crystal panel to the windshield of the vehicle. While in operation, however, changing ambient light conditions can create glare and wash out the display in sunlight or, in dim light, the display may appear harshly bright.

SUMMARY OF THE INVENTION

This invention is directed to an improved head up display where the image of the display is projected onto a transparent or semitransparent screen having a high-speed, adjustable transparency to compensate for changing ambient light conditions. With the use of this invention, when ambient light conditions change, the image will appear brighter in high light conditions and will appear dimmer in low light conditions. Thus, according to this invention, the head up display system, installed in an airplane or vehicle, will include a light-emitting image source for projecting an image generated from an airplane or vehicle instrument control panel via reflective elements to a display screen in the view of the airplane or vehicle operator. This improved display screen has adjustable transparency capabilities to compensate for changing ambient light conditions for enhanced viewing properties of the airplane or vehicle operator.

DETAILED DESCRIPTION OF THE INVENTION

Figure 1:
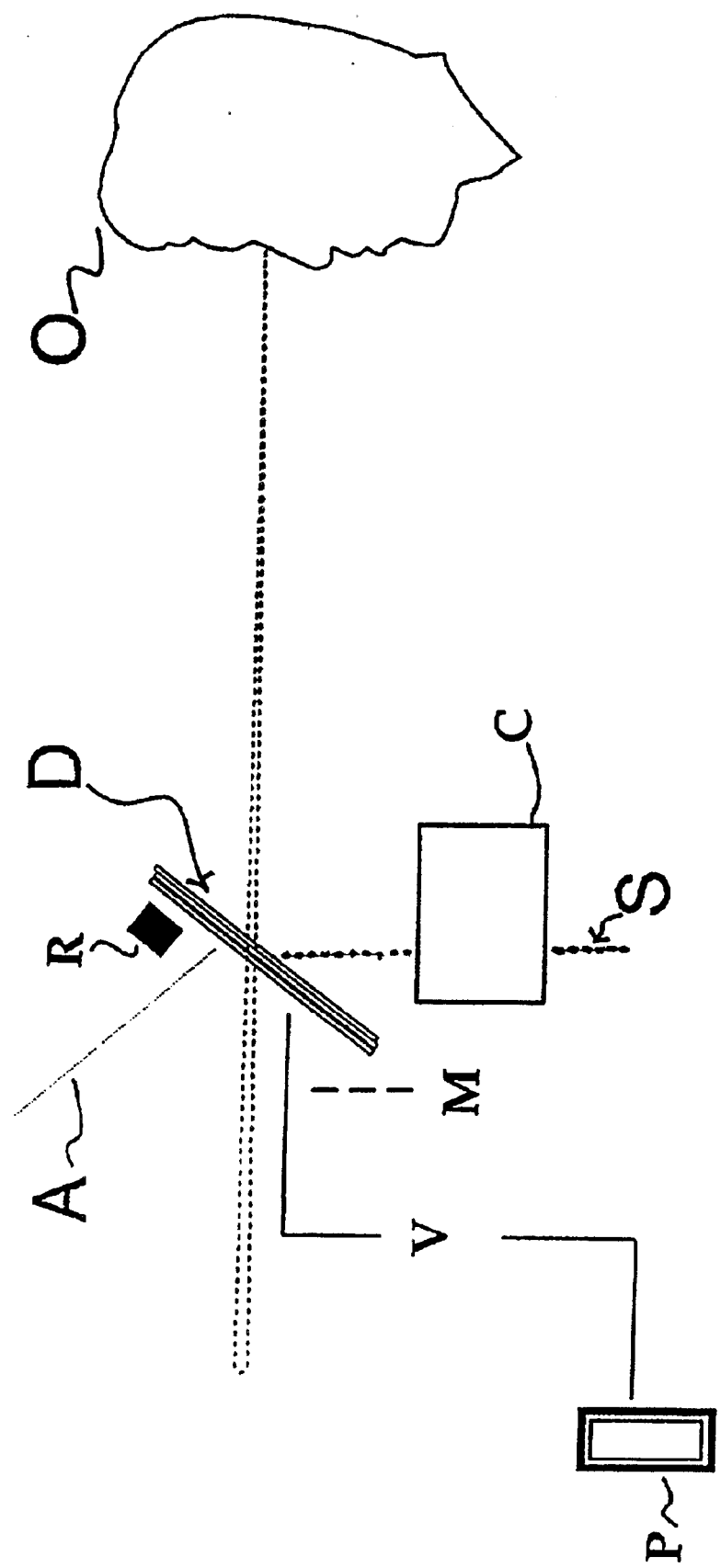
FIG. 1 is a schematic side elevation of the invention showing the head up display system with a transparent or semitransparent display screen.

FIG. 1 is a schematic of a head up display incorporating the present invention. For purposes of illustration, it is assumed that the head up display system is installed in a jet aircraft, although this invention is applicable to automobile, van, and truck vehicles. A head up display screen D is provided for projecting as a virtual image the information from the instrument control panel C in the airplane in the front visual field. The pilot O has a display screen D in his forward line of vision. The display includes a light source S which projects a display on screen D and is visible to the pilot. Ambient light A may strike the backside of the display screen D, which could adversely affect visibility of the display to the pilot. Intense sunlight striking the back of screen D will tend to wash out the display. A change in sunlight conditions from sunlight to darkness or very low light conditions can make the display appear so bright that it may adversely affect night vision.

Figure 2:
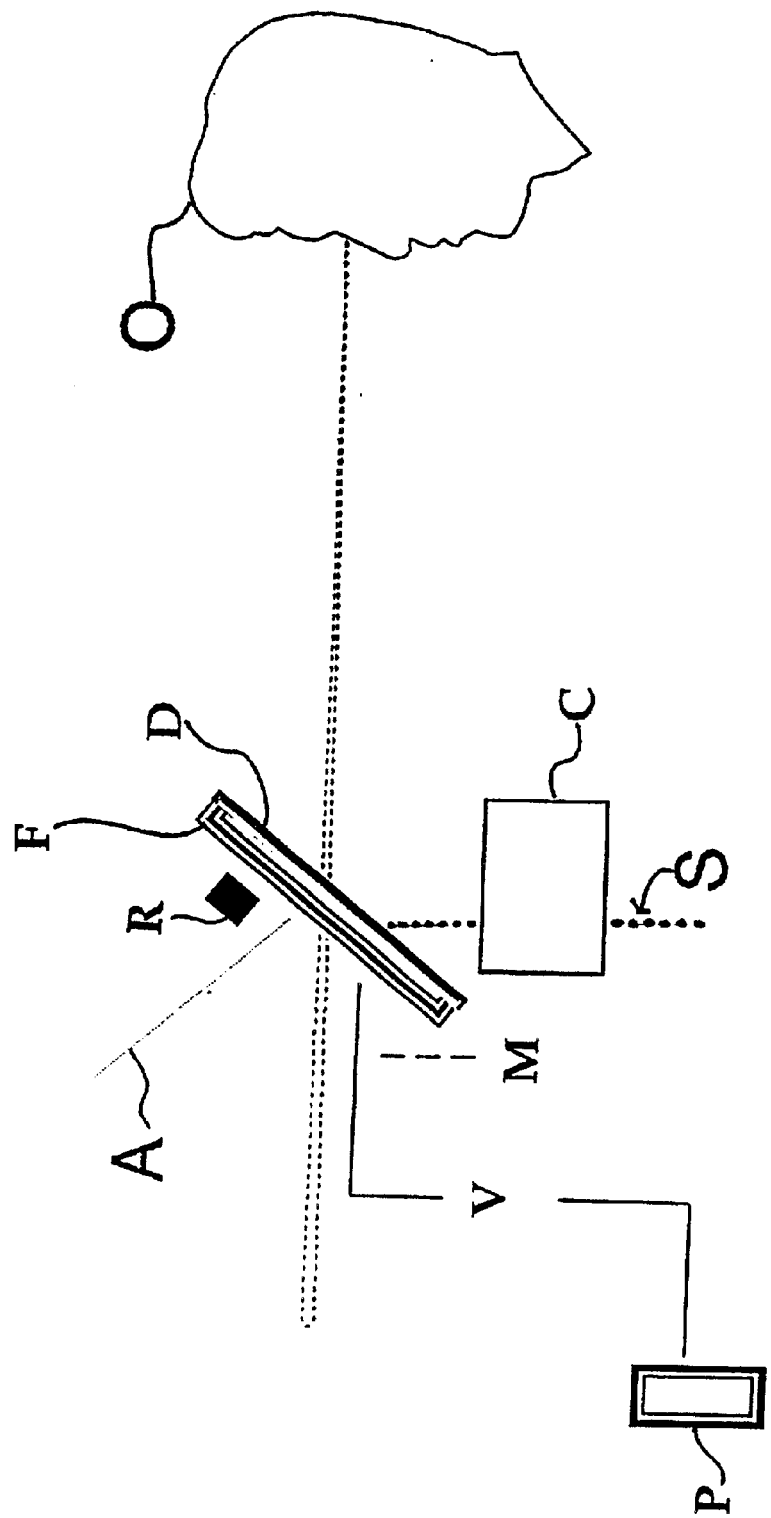
FIG. 2 is a schematic side elevation of the invention showing a head up display system with a normal display panel filtered with a liquid crystal display panel.

According to the present invention, the display screen D has a high-speed, adjustable transparency. The preferred screen is, as illustrated, a liquid crystal display screen connected to a power source P through a voltage control V. The control for the power source may be manual M or coupled to a light responsive sensor R. In an alternative embodiment, as shown in FIG. 2, prior art display screen $D^-$ is filtered with a display screen F, illustrated as a liquid crystal display screen, which is capable of very quickly becoming darker or lighter in response to changing ambient light conditions.

Liquid crystal displays that are connected to power sources are advantageous in that they are small and thin and consume a low amount of power. The liquid-crystal display is a liquid crystal panel which has a thin, liquid crystal layer filled between two transparent substrates, each of which has transparent electrodes, a driver circuit which supplies a signal voltage to the electrodes and a light source which emits light to the liquid crystal panel. As used here, a liquid crystal display is intended to include all of those liquids which are double-refracting and in which interference patterns are formed in the presence of polarized light.

A preferred type of liquid crystal display is a polymer-dispersed liquid crystal (PDLC) window. PDLC windows are based on the ability of the nematic director of the liquid crystal droplets to align under an electric field. In a typical application, a thin PDLC film is deposited between clear plastic covers. The plastic substrates are coated with a very thin layer of a conducting material, indium tin oxide. When no electric field is applied, the orientation of the nematic liquid crystal molecules within the droplets is random. The materials are selected so that the index of refraction of the droplets is different from the index of the polymer matrix. In this case, light is strongly scattered and the cell appears opaque. When a voltage is applied across two conducting layers, however, the liquid crystals inside the droplets align with the field. This time, the index of refraction of the PDLC layer is nearly equal to that of the polymer matrix and no light is scattered. The display screen now appears transparent. This PDLC window display operates on 60 to 90 volts AC/60 c, drawing approximately 20 mA per square foot. The response time to changing ambient light conditions is 10 milliseconds. Controlling the voltage will control the clarity.

The preferred liquid display panel can change colors in response to a sudden change from darkness to light in less than 0.5 seconds, preferably in less than 0.25 seconds and from light to darkness in less than 0.5 seconds, preferably in less than 0.25 seconds, and most preferred in less than 0.10 seconds.

In another preferred embodiment, the liquid crystal panels employing the electro-optical effect use a solar cell as a power source. In this embodiment, there is included a voltage detecting circuit having such a hysteresis characteristic so as to output a signal for changing transmittance of the liquid crystal panel from a high mode to a low mode at the lowest possible predetermined voltage or illumination, and changing transmittance from a low mode to a high mode at highest possible voltage or illumination. The panel includes a first switch which operates at least two switch positions, one switch position having a first stage of illumination at less than 20,000 Lux and a second stage of illumination at 20,000 Lux or greater at which transmittance is changed from a high mode and another switch position disabling the voltage detecting circuit. Also included is a second switch which operates to change transmittance from a high mode to a low mode independently of the set voltage value in the voltage detecting circuit according to the hysteresis effect.

In another preferred embodiment, the display screen is based on electrochromic technology. Electrochromic display panels have special properties based on open-circuit memory; areas of the display can be turned dark or light by a pulse of current, whereupon they stay in whatever state they have been switched to without any further application of power, until the next pulse alters the state again. Electrochromics also produce a very high contrast ratio and do not wash out in direct sunlight. In addition, there are no restrictions on viewing angle, as there may be with liquid crystal displays. The composition of an electrochromic display is a polymer paste that is mixed and formed into a multilayered tape, or is silk-screened evenly on a transparent glass or plastic substrate. The paste is an aqueous solution mixing bismuth chloride, copper chloride, and lithium bromide, gelled with a cellulose ether. The electrolyte, as with the liquid crystal display material, is sandwiched between electrodes to which control signals are applied. The material can be switched between a deep-black state and a clear white or gray color, depending on the design. Color can be added through the use of filters. Electrochromic displays, however, do not have as fast a response time as do liquid crystal displays.

The present invention may be subject to many modifications and changes without departing from the spirit or essential characteristics thereof. The present embodiment should, therefore, be considered in all respects as being illustrative and not restrictive of the scope of the invention as defined in the appended claims.

What is claimed is:

1. A head up display system in an airplane or vehicle comprising a light emitting image source for projecting an image generated from a control panel to a field of view of an operator of the airplane or vehicle, the system comprising:
    a light source operably coupled to a control panel for projecting an image therefrom;
    a display screen comprising one of a liquid crystal display panel and an electrochromic display panel, wherein the display screen is bounded by a first surface oriented to receive the image projected from the light source without prior passage thereof through the display screen and a second, opposing surface oriented to receive ambient light;
    a power source configured to provide an output for adjusting a transparency of the display screen to the ambient light; and
    a light responsive sensor positioned to receive the ambient light without prior passage thereof through the display screen, the light responsive sensor being operably coupled to a control device for altering the output of the power source responsive to an intensity of the ambient light.

2. The head up display system of claim 1, wherein the display screen is a polymer-dispersed liquid crystal window.

3. The head up display system of claim 1, wherein the power source is a solar cell and the control device comprises a voltage detecting circuit operably coupled to the solar cell and having a hysteresis characteristic so as to output a signal for changing the transparency of the display screen between a low mode and a high mode respectively above and below a predetermined threshold of illumination provided by the ambient light.

4. A head up display system in an airplane or vehicle comprising a light emitting image source for projecting an image generated from a control panel to a field of view of an operator of the airplane or vehicle, the system comprising:
    a light source operably coupled to a control panel for projecting an image therefrom;
    a first display screen having a first surface oriented to receive the image projected from the light source without prior passage thereof through the first display screen and a second, opposing surface oriented to receive ambient light;
    a second display screen overlying the second, opposing surface of the first display screen, wherein the second display screen comprises one of a liquid crystal display panel and an electrochromic display panel;
    a power source configured to provide an output for adjusting a transparency of the second display screen to the ambient light; and
    a light responsive sensor positioned to receive the ambient light without prior passage thereof through the first display screen or the second display screen, the light responsive sensor being operably coupled to a control device for altering the output of the power source responsive to an intensity of the ambient light.

5. The head up display system of claim 4, wherein the power source is a solar cell and the control device comprises a voltage detecting circuit operably coupled to the solar cell and having a hysteresis characteristic so as to output a signal for changing the transparency of the second display screen between a low mode and a high mode respectively above and below a predetermined threshold of illumination provided by the ambient light.

6. The head up display system of claim 4, wherein the second screen is a polymer-dispersed liquid crystal window.

* * * * *